(12) United States Patent
Altrichter et al.

(10) Patent No.: US 8,131,706 B2
(45) Date of Patent: Mar. 6, 2012

(54) DYNAMIC BINDING OF PORTLETS

(75) Inventors: Ralf Altrichter, Filderstadt (DE); Peter Fischer, Filderstadt-Bonlanden (DE); Timo Kussmaul, Boeblingen (DE); Stephan Laertz, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/936,970

(22) Filed: Nov. 8, 2007

(65) Prior Publication Data

US 2008/0120343 A1 May 22, 2008

(30) Foreign Application Priority Data

Nov. 20, 2006 (EP) .................................... 06124361

(51) Int. Cl.
*G06F 7/00* (2006.01)
(52) U.S. Cl. ........................................ 707/707; 707/802
(58) Field of Classification Search .................. 707/707, 707/802; 709/217; 717/174
See application file for complete search history.

(56) References Cited

U.S. PATENT DOCUMENTS

| | | | | |
|---|---|---|---|---|
| 7,472,342 B2 * | 12/2008 | Haut et al. | ...................... | 715/234 |
| 7,502,853 B2 * | 3/2009 | Allamaraju et al. | ........... | 709/224 |
| 7,574,712 B2 * | 8/2009 | Allamaraju et al. | ........... | 719/318 |
| 7,624,160 B2 * | 11/2009 | Henderson et al. | ............ | 709/219 |
| 7,653,659 B2 * | 1/2010 | Kussmaul et al. | ...... | 707/999.107 |
| 7,836,460 B2 * | 11/2010 | Kussmaul et al. | ............ | 719/320 |
| 7,877,465 B2 * | 1/2011 | Kontamsetty et al. | ......... | 709/220 |
| 2002/0169852 A1 * | 11/2002 | Schaeck | ........... | 709/218 |
| 2003/0167315 A1 * | 9/2003 | Chowdhry et al. | ............ | 709/218 |
| 2005/0256940 A1 * | 11/2005 | Henderson et al. | ............ | 709/219 |
| 2005/0267789 A1 * | 12/2005 | Satyadas et al. | ................... | 705/7 |
| 2006/0036954 A1 * | 2/2006 | Satyadas et al. | ............... | 715/742 |
| 2006/0136587 A1 * | 6/2006 | Allamaraju et al. | ........... | 709/224 |
| 2006/0136588 A1 * | 6/2006 | Allamaraju et al. | ........... | 709/224 |
| 2006/0168102 A1 * | 7/2006 | Faller et al. | .................... | 709/217 |
| 2006/0287861 A1 * | 12/2006 | Fischer et al. | ................. | 704/260 |

(Continued)

OTHER PUBLICATIONS

Thomas Schaeck, WebSphere Portal Server and Web Services Whitepaper, IBS Software Group, 2001, pp. 1-22.*

*Primary Examiner* — Shahid Alam
*Assistant Examiner* — Alexandria Bromell
(74) *Attorney, Agent, or Firm* — Raymond Szeto; Hoffman Warnick LLC

(57) ABSTRACT

The present invention relates to a method and respective system for binding a portlet into a web portal infrastructure comprising at least one portal and a plurality of portlets. A method in accordance with an embodiment includes: storing a portlet profile data structure, wherein the portlet profile data structure is associated with a portlet and is deployed at a portal server, and wherein the portlet profile data structure declares a portlet class and at least one portlet characteristic; storing a portlet binding policy data structure, which is associated with the portlet class and is deployed at a portal server, wherein the portlet binding policy data structure declares relations or conditions specifying the at least one portlet characteristic; during processing of an incoming request for a portlet, automatically selecting the portlet class, all stored portlet profile data structures, and the portlet binding policy data structure associated with the requested portlet; performing a cross-checking of the relations or conditions of the selected binding policy data structure against the portlet characteristics of the selected portlet profile data structures; automatically selecting a favorite portlet out of the selected portlets, which best matches best the cross-checking; and invoking the favorite portlet for rendering in response to the incoming request.

12 Claims, 8 Drawing Sheets

U.S. PATENT DOCUMENTS

| | | | |
|---|---|---|---|
| 2007/0124688 A1* | 5/2007 | Nauerz et al. | 715/746 |
| 2007/0136236 A1* | 6/2007 | Kussmaul et al. | 707/707 |
| 2007/0136329 A1* | 6/2007 | Kussmaul et al. | 707/707 |
| 2007/0271554 A1* | 11/2007 | Fletcher et al. | 717/147 |
| 2008/0104611 A1* | 5/2008 | Kussmaul | 719/311 |
| 2008/0120343 A1* | 5/2008 | Altrichter et al. | 707/707 |
| 2009/0006586 A1* | 1/2009 | Kurz et al. | 709/220 |
| 2010/0217777 A1* | 8/2010 | Kussmaul et al. | 707/776 |

* cited by examiner

PRIOR ART
PORTAL SERVER

Sample portlet profiles data structure:

```
Portlet: StocksQuick
Class: urn:portletclass:ShowStockQuotes
QoS1: ResponseTime=1
QoS2: Availability=95
```
72

```
Portlet: StocksReliable
Class: urn:portletclass:ShowStockQuote
QoS1: ResponseTime=3
QoS2: Availability=99.9
```
74

Sample portlet binding policy data structure:

```
Policy: StockQuotes
Class: urn:portletclass:ShowStockQuotes
ResponseTime: Prefer lower
Availability>=95
```
76

FIG. 7

DYNAMIC BINDING OF PORTLETS

FIELD OF THE INVENTION

The present invention relates to the field of network computing, and in particular to web content accessible via a web portal. The present invention further relates to a method and respective system for binding a portlet into a web portal infrastructure comprising at least one portal and a plurality of portlets, wherein a request incoming from a client requesting a portlet is received and processed.

BACKGROUND OF THE INVENTION

Portals provide end users with unified access to content, applications, and collaboration services in a highly personalized manner. An example is IBM's WebSphere Portal which provides a middleware framework and tools for building and managing portals using component applications called "portlets".

Typically, a portal employs an architecture where the portal itself only implements standard functionality like authentication, state handling, aggregation, caching, user management, etc., and provides the infrastructure for application components. This architecture includes APIs for the integration of applications so that applications from different partners can be used as long as they match the portal product's API. In the portal environment, these applications are typically called portlets.

Portlets are pluggable components that can be added to portals and are designed to run inside a portal's portlet container. Portlets may provide different functions ranging from simple rendering of static or dynamic content to application functions such as e-mail, calendar, etc. Portlets are invoked indirectly via the portal application and produce content that is suited for aggregation in larger pages, e.g., portlets should produce mark-up fragments adhering guidelines that assure that the content generated by different portlets can be aggregated into one page. Typically, portlets run on a portal server, processing input data and rendering content locally.

FIG. 1 provides a schematic system view of a web server implementing such a prior art portal.

A portal is typically implemented on a network server, for example a web server 100, which includes various logic components for user authentication 105, state handling 110, and aggregation 170 of fragments. The web server 100 further includes a plurality of portlets 120 provided in respective pages 125, with a respective plurality of APIs 130 to a respective portlet container software 135 for setting the pages 125 into a common web page context, and some portal storage resources 140. The logic components are operatively connected such that data can be exchanged between single components as required.

A portal engine of the web server 100 in FIG. 1 implements an aggregation of portlets 120 based on an underlying portal model 150 and portal information such as security settings, user roles, customization settings, and device capabilities. Within a rendered page 125, the portal automatically generates the appropriate set of navigation elements based on the portal model 150. The portal engine invokes portlets 120 during the aggregation as required and when required and uses caching to reduce the number of requests made to the portlets 120.

The portal model 150 represents the portal's content structure, i.e., the hierarchical structure of portal pages 125, which may again contain nested pages, and portlets 120, which are arranged on pages. This data is stored in a portal database 128 in an adequate representation based on prior art techniques such as relational tables.

Web clients interact with portlets 120 via a request/response paradigm implemented by the portal. Usually, users interact with content produced by portlets 120 by, for example, following links or submitting forms, resulting in portlet actions being received by the portal, which are then forwarded to the portlets targeted by the user's interactions.

Accordingly, the portal waits for client requests and responds to these requests. A client request message includes an URL/URI which addresses the requested page.

The aggregation logic 170 includes all steps that are required to assemble a page 125 that is sent back to the client. Typically, these steps include loading the portal model 150 from the portal database 128, traversing the portal model 150, and calling the instances referenced in the portal model 150 in order to obtain their output, which is assembled to a single page 125. The portal model 150 may be defined as the relationship as well as the arrangement of the components that are used to create the visual representation of the content. The portal model 150 can be defined through a manual layout interface 160 by administrators or users and saved in the portal database 128.

One activity in the rendering and aggregation processes is the generation of URLs that address portal pages 125. An URL is generated by the aggregation logic 170 and includes coded state information.

By including the state information in an URL, the portal ensures that it is later able to establish the navigation and presentation context when the client sends a request for this URL.

The portlet container 135 is a single control component competent for all portlets 120, which may control the execution of code residing in each of the portlets 120. The portlet container 135 provides a runtime environment for the portlets 120 and the facilities required for event handling, inter-portlet messaging, and access to portlet instance and configuration data, etc. The portal resources 140 include the portlets 120 themselves and the pages 125, on which the portlets 120 are aggregated in form of an aggregation of fragments. The portal database 128 stores the portlet description, which includes the portlet identifier, and which includes attributes such as portlet name, portlet description, portlet title, portlet short title, and keywords.

Referring now to FIG. 2B, there is illustrated a diagram of a portal server with focus on portal interaction flow.

In the main processing flow of a portal, a request is sent to the server where it is processed and answered. The first step in processing a request is to verify that the sender is authenticated to interact with the server, see step 310. The result of this verification influences the response of the server; if the sender is not correctly authenticated the request may be denied or the sender is prompted to provide credentials.

As a second step 320, the navigational state, which represents the state of portal resources for a particular request, is deserialized and prepared for modification or for again serializing the navigational state into URLs. Among other information, the navigational state contains at least the identification of the requested page.

Navigational state may contain actions which are to be executed when a request transporting this state is sent to the portal. This is done in the action processing phase, step 330, which executes the encoded actions. These actions may modify server-side state, resources that can be managed through portal and/or influence the generation of the response.

Finally, the response is generated in the aggregation phase 340 based on the navigational state valid for the request by aggregating markup from different sources and writing the combined output to the response. During the aggregation phase, the set of portlets to be invoked according to the navigational state is determined (i.e., the set of portlets that are arranged on the requested page) and each portlet is invoked by issuing a request to the portlet container (see FIG. 2A, renderPortlet( ) requests). This request contains the identification of the portlet as well as the portlet state.

The portlet container prepares the portlet context according to portlet ID and portlet state included in or referenced by the renderPortlet( ) request. This may require reading and processing the portlet definition from the portal database. Then, the portlet container invokes the portlet providing the portlet context (see FIG. 2A, render( ) requests). The portlet container accepts the markup fragment generated by the portlet. After this, processing of the request ends, step 350.

Referring again to FIG. 1, portlet deployment 180 allows an administrator to deploy portlets 120. The portlet deployment 180 accepts an external representation of a portlet 120, e.g., a portlet application in the form of an application archive, and stores the portlet resources such as code, jsp files, html files, etc., either in the portal database 128 or in a repository of an underlying application server or web server. In addition it stores the portlet definition of the portlets 120 contained in the portlet application in the portal database 128.

Using the manual layout interface 160, a user or an administrator may modify the portal model 150, i.e., the content structure, e.g., by creating new pages 125, modifying pages 125, and arranging portlets 120 on pages 125. The manual layout interface 160 stores these changes in the portal database 128.

A prior art portal such as that described above realizes a binding of portlets, which is fixed during deployment in case of a local portlet or by configuration for the case of a remote portlet. This is insufficient in regard to flexibility and selectivity when satisfying the needs of web portal visitors. As such, it is desirable to have portal architectures offering more flexibility and selectivity when providing portlets to portal visitors.

SUMMARY OF THE INVENTION

The present invention provides a method for binding a portlet into a web portal infrastructure which is more flexible, thereby allowing better adaptation to specific user needs.

The present invention provides a method for dynamically switching between different portlet bindings during runtime, i.e., when an incoming request for a portlet is processed. A portal implementing the method realizes a dynamic binding of portlets. Performing a dynamic binding during request processing enables the realization of flexible binding heuristics and adaptation to changing market requirements and to changes in the computing environment, for example, to selectively adapt to different workload situations of the involved web servers implementing the portal. To this extent, the present invention brings forward on-demand concepts to portals and thus enables dynamic adaptation to quality of service requirements, financial requirements, etc.

According an aspect of the present invention, there is provided a method for binding a portlet into a web portal infrastructure comprising at least one portal and a plurality of portlets, wherein a request incoming from a client requesting a portlet is received and processed, comprising: automatically determining a plurality of portlets matching respective pre-defined portlet characteristics being pre-associated with the requested portlet; automatically selecting a favorite portlet out of the plurality of portlets; and invoking the selected portlet for rendering in response to the incoming request.

According to an aspect of the invention, there is provided a method for binding a portlet into a web portal infrastructure comprising at least a portal and a plurality of portlets, comprising: storing a portlet profile data structure, wherein the portlet profile data structure is associated with a portlet and is deployed at a portal server, and wherein the portlet profile data structure declares a portlet class and at least one portlet characteristic; storing a portlet binding policy data structure, which is associated with the portlet class and is deployed at a portal server, wherein the portlet binding policy data structure declares relations or conditions specifying the at least one portlet characteristic; during processing of an incoming request for a portlet, automatically selecting the portlet class, all stored portlet profile data structures, and the portlet binding policy data structure associated with the requested portlet; performing a cross-checking of the relations or conditions of the selected binding policy data structure against the portlet characteristics of the selected portlet profile data structures; automatically selecting a favorite portlet out of the selected portlets, which best matches best the cross-checking; and invoking the favorite portlet for rendering in response to the incoming request.

BRIEF DESCRIPTION OF THE DRAWINGS

These and other features of the invention will be more readily understood from the following detailed description of the various aspects of the invention taken in conjunction with the accompanying drawings.

FIG. 7 depicts illustrative portlet profile data structures and a sample portlet binding policy data structure according to embodiments of the present invention.

DETAILED DESCRIPTION OF THE INVENTION

Figure 1:
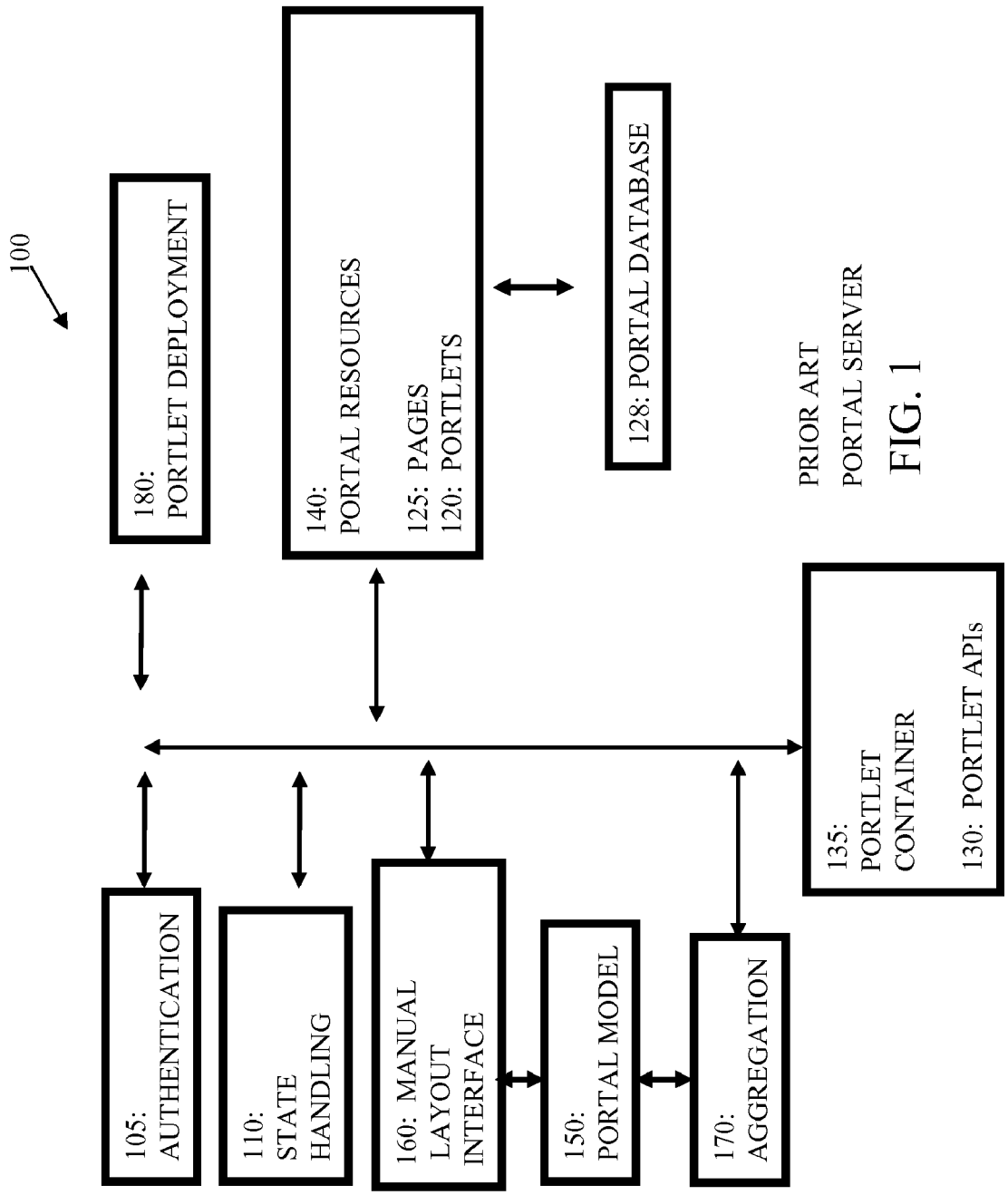
FIG. 1 depicts illustrative components of a hardware and software environment of a portal server for providing a web portal in accordance with the prior art.
Figure 2A:
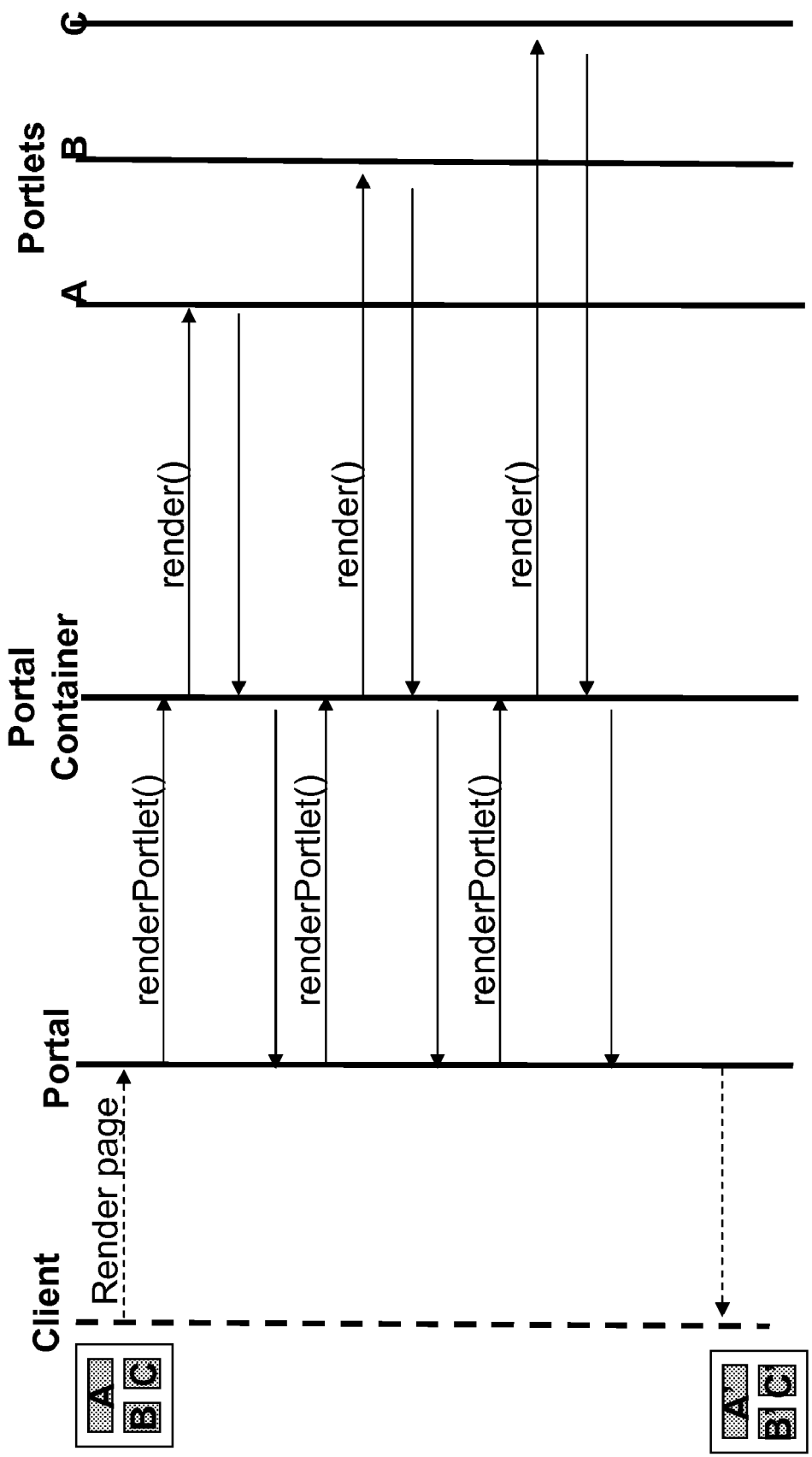
FIG. 2A depicts, in an interaction diagram, processing between a client and a portal and between portal components in accordance with the prior art.
Figure 2B:
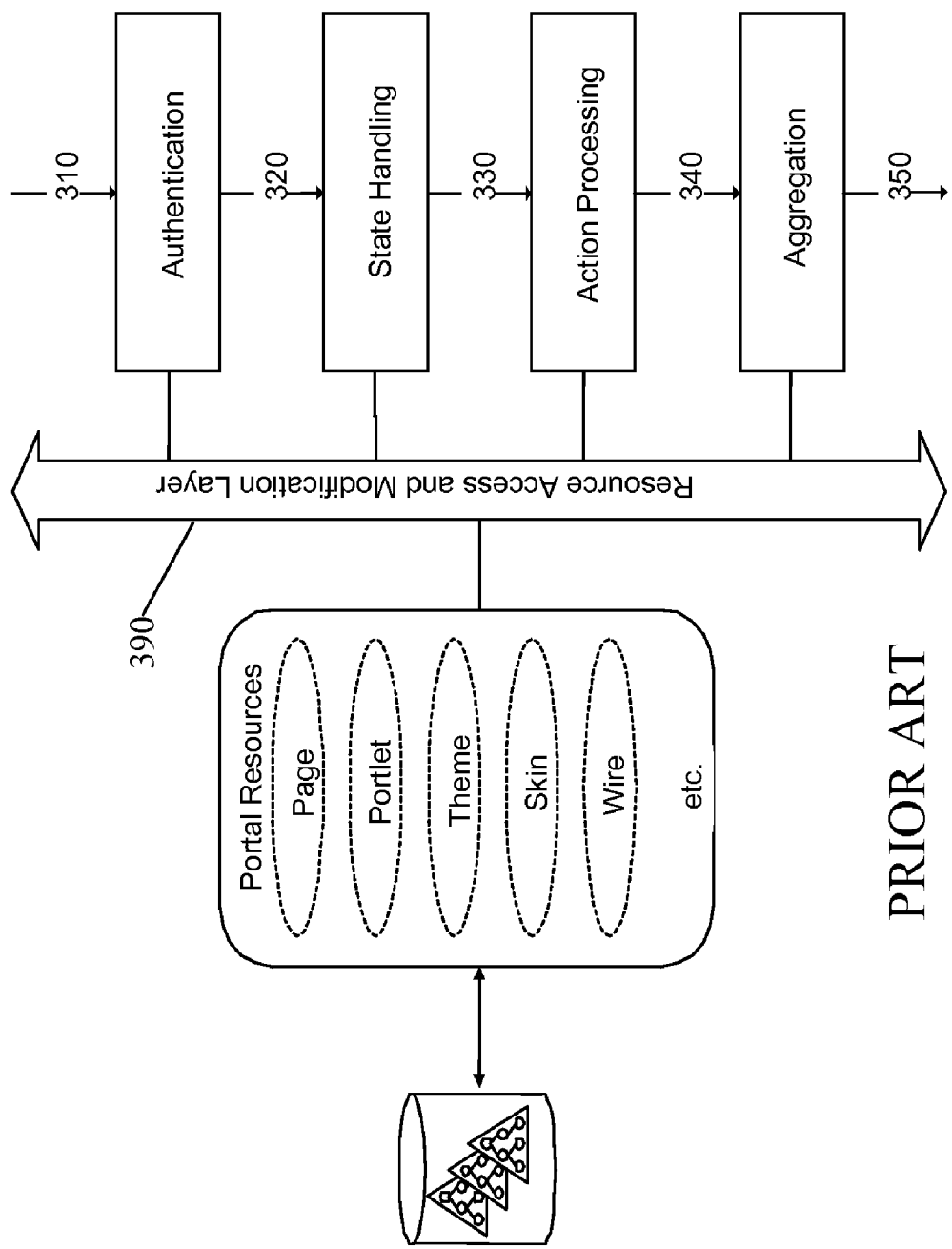
FIG. 2B depicts, in an interaction diagram, processing of a request in a portal server in accordance with the prior art.
Figure 3:
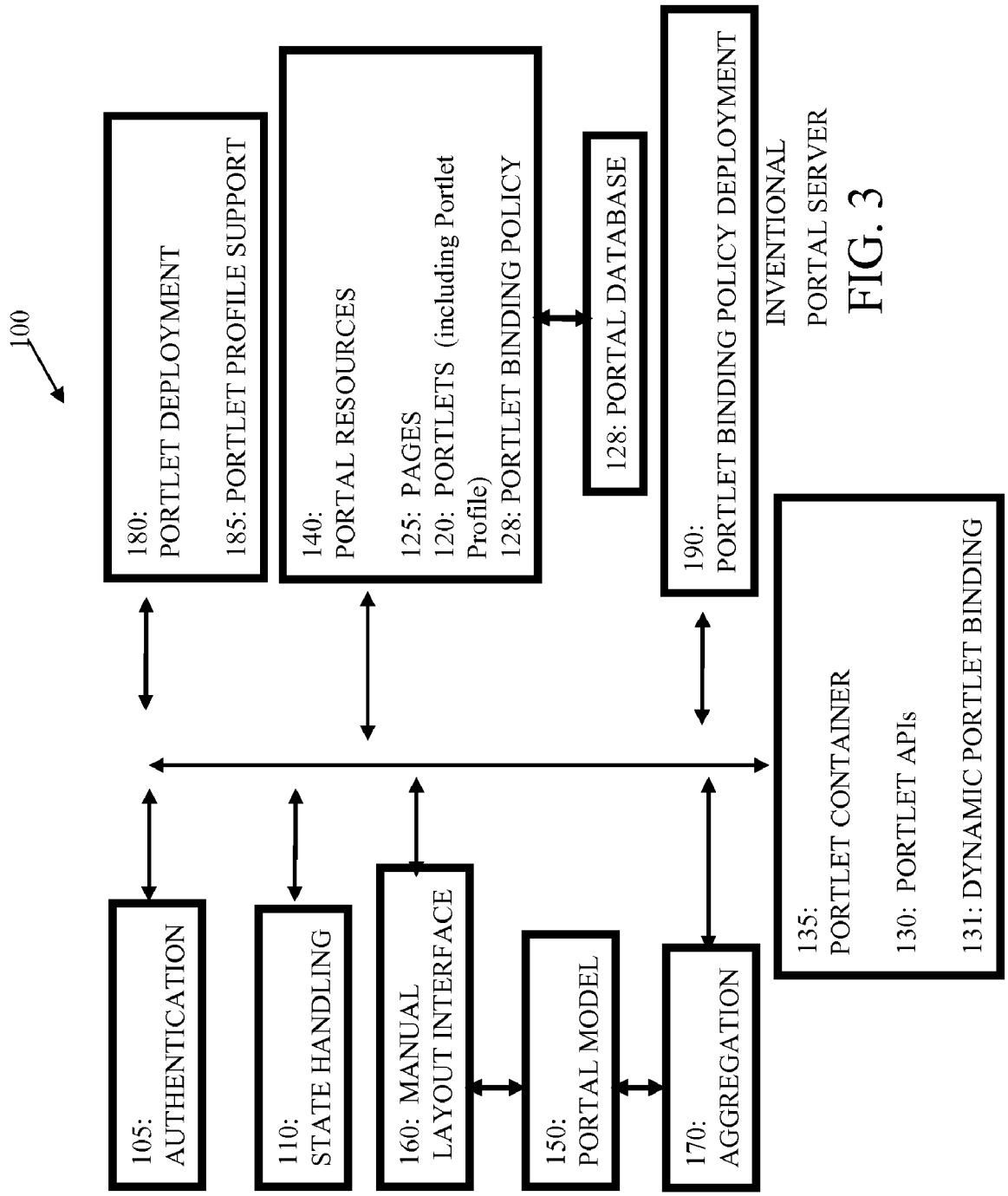
FIG. 3 depicts a web portal hardware and software environment in accordance with an embodiment of the present invention.

With general reference to the figures, and with special reference now to FIGS. 3 and 7, a portlet 120 is associated with a portlet profile data structure 72, 74, which is stored in the portal database 128 as part of a portlet definition.

FIG. 7 shows two sample portlet profile data structures 72 and 74. A portlet profile data structure 72 or 74 declares the class of a portlet and several quality of service attributes. The class of a portlet designates the functionality and semantics a portlet provides. Multiple portlets can be associated with the same class, showing that these portlets provide the same functionality.

The class of a portlet is identified by a text identifier, e.g., "ShowStockQuotes". In the example depicted in FIG. 7, both portlets belong to the same class of portlets, thus having identical functionality, but offering a different degree of quality of service. The quality of service attributes characterize (and quantify) the quality of service a portlet offers regarding different aspects, such as availability, response time, price, etc. The quality of service attributes comprise a set of arbitrary numerical attributes (e.g., 95), which are identified by a textual identifier (e.g., "Availability"). Numerical attributes are best suited to be evaluated by a policy data structure 76, which prefers a lower response time and an availability which is assessed to be at least 95(%) or higher. Of course, also other attributes, such as strong, medium or reduced, or other qualifying or quantifying attributes, can be applied including fuzzy values.

For the purpose of deployment, a portlet profile data structure 72, 74 can be included in a portlet application archive. This allows a portlet deployment profile support component 185 to read the portlet profile data structure 72, 74 during portlet deployment and to store it in the portlet database 128 as part of the portal resources (see FIG. 3, 120).

A portlet binding policy deployment (PBPD) component 190 realizes the deployment of a portlet binding policy data structure 76. It accepts a portlet binding policy definition in an external representation (as exemplified in FIG. 7, e.g., in the form of a text file) and stores it in the portal database 128 in the form of a new type of resource 128. PBPD may also include a graphical user interface through which an administrator may interactively define and deploy a portlet binding policy data structure 76.

There is at most one portlet binding policy data structure 76 per portlet class. A portlet binding policy data structure 76 refers to a portlet class (e.g., urn:portletclass:ShowStockQuotes) and contains a set of predicates over quality of service attributes (e.g., "Availabilty>=95", "ResponseTime: Prefer lower").

In an embodiment, the dynamic portlet binding functionality is implemented in the portlet container 135 which, in contrast to prior art, is extended to perform dynamic portlet binding. To this extent, the external interfaces of the portlet container 135 are not changed.

Figure 4:
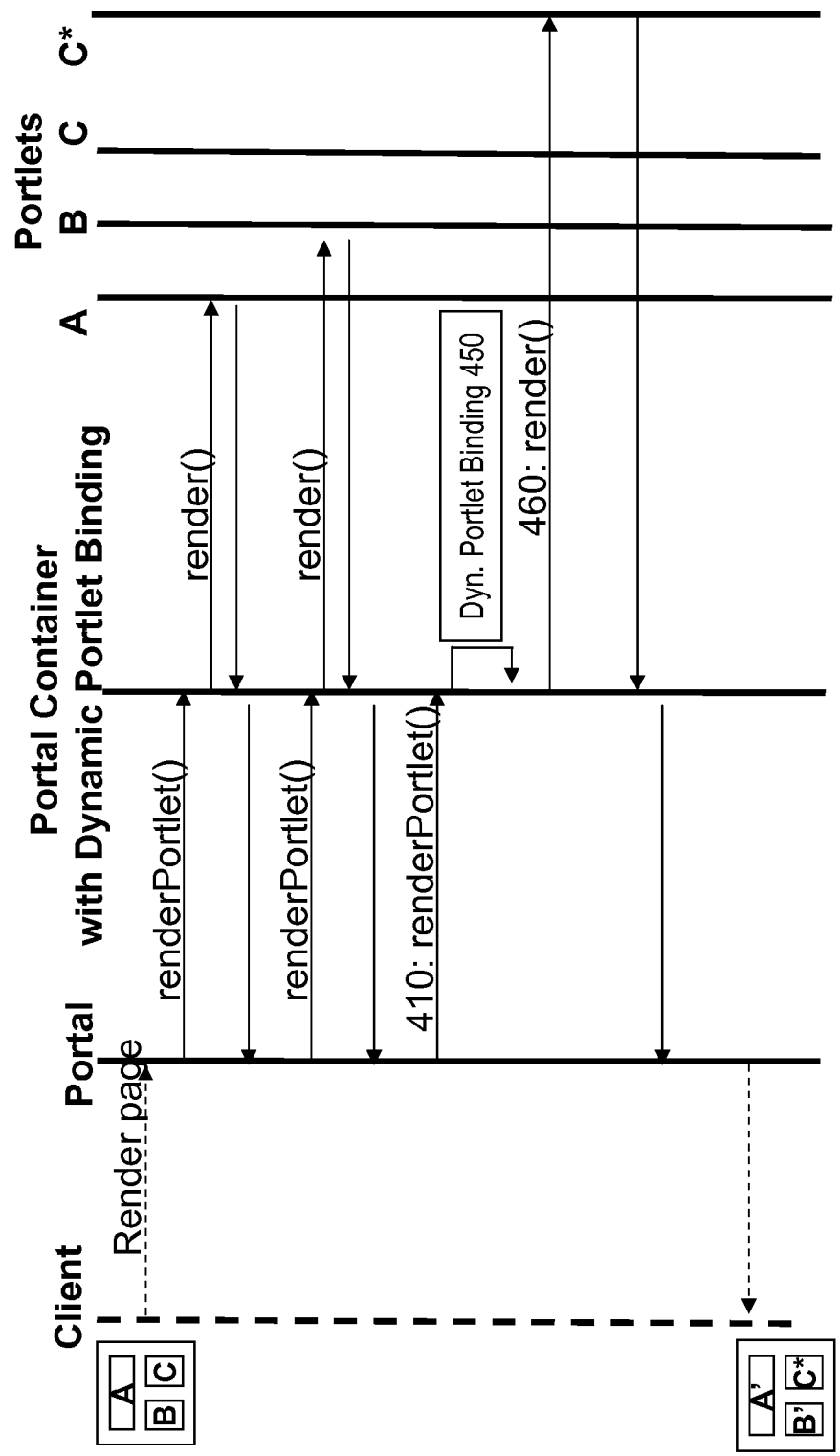
FIGS. 4 and 5 depict, in interaction diagrams, processing between a client and a portal and between portal components, in accordance with embodiments of the present invention.
Figure 6:
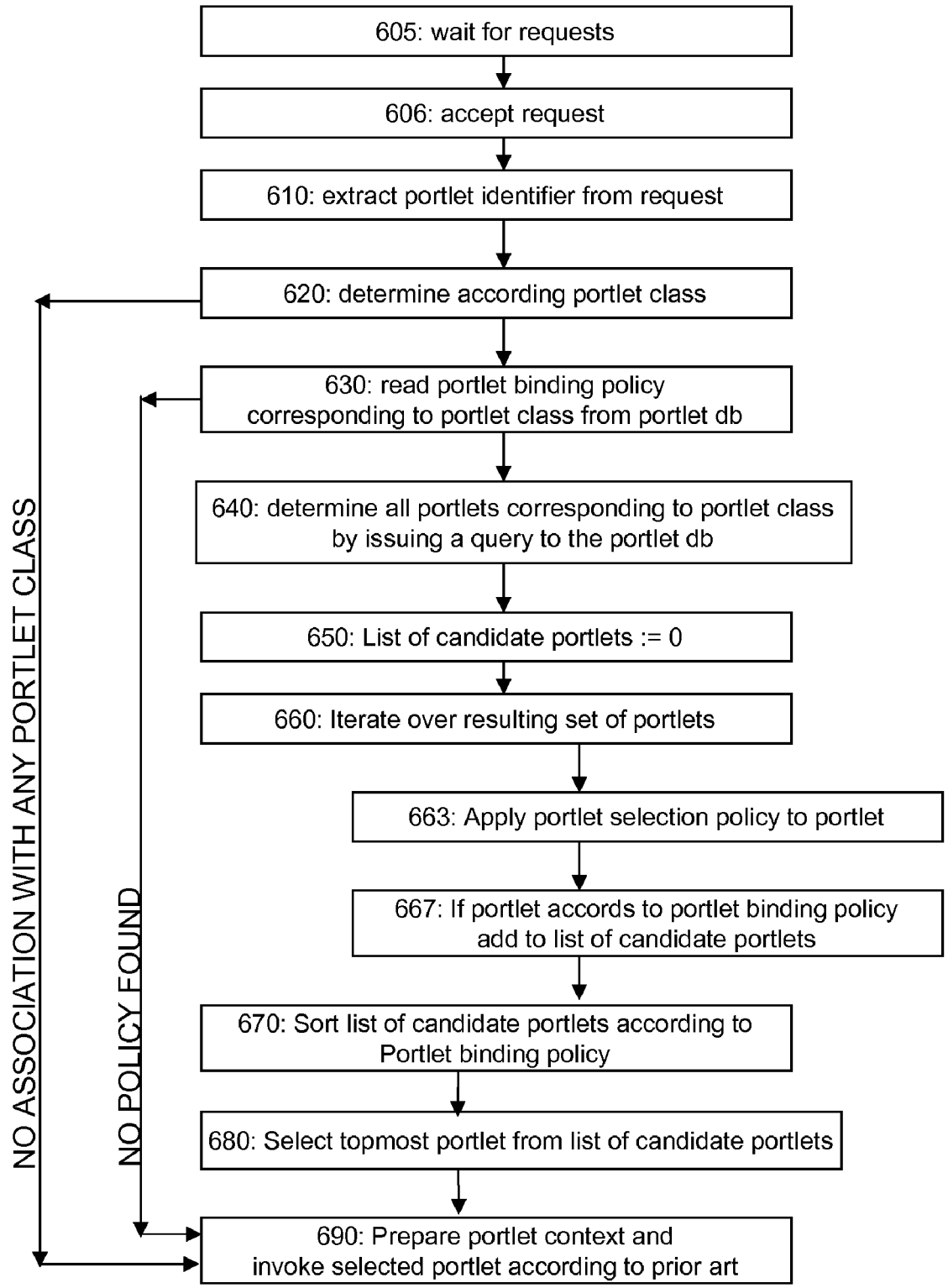
FIG. 6 depicts a control flow performed by a container or proxy portlet in accordance with embodiments) of the present invention.

FIG. 4 illustrates the interactions in an embodiment of the present invention. When the portlet container receives a request for a portlet C (410), it performs dynamic portlet binding (DPB) (450) using the passed portlet identifier. DPB determines the portlets which are functionally equivalent with the requested portlet, i.e., the portlets which are associated with the same portlet class, and optimally obeys the portlet binding policy data structure 76 for this class. Thus, the portlet container selects the portlet denoted here as C*, which currently is best suited for the portlet binding policy. Finally the portlet C* is invoked (460), using prior art techniques. This mechanism is implemented in the control flow depicted in FIG. 6

First, the portlet container waits for requests (605). When a request arrives, the portlet container accepts the request (606) and extracts the portlet identifier from the request (610). The portlet identifier may be an arbitrary identifier which is suited to uniquely identify a portlet. In an embodiment, it is a textual identifier. Next, the portlet container determines the portlet class the requested portlet is associated with (620). For this purpose the portlet container issues a query for the portlet policy to the portlet database, the query including the portlet identifier. If the portlet is not associated with any portlet class, i.e., there is no portlet profile data structure 72, 74 for this portlet returned by the database, then processing continues according to the prior art by invoking the portlet (690).

Otherwise, the portlet container reads the portlet binding policy data structure 76 corresponding to the portlet class (630) by issuing a query to the database, the query containing the portlet class identifier. If no portlet binding policy data structure 76 is defined for this portlet class, i.e., the portlet database does not return a result, and processing continues according to the prior art by invoking the portlet (690).

If, in contrast, a portlet binding policy data structure 76 is found (630), the portlet container determines the set of portlets corresponding to this portlet class by issuing a further request to the database, the request containing the portlet class identifier (640).

The portlet container initializes a variable containing a list of candidate portlets by assigning an empty list (650). Then, the portlet container iterates over the set of the resulting portlets (660). For each portlet, the portlet container applies the portlet selection policy (663). For this purpose, the quality of service attributes of the portlet are compared to the predicates specified in the portlet binding policy data structure 76. If the portlet accords to the portlet binding policy data structure 76, i.e., if its quality of service attributes accord to the predicates, it is added to the list of candidate portlets (667).

The resulting list of candidate portlets is sorted according to the portlet binding policy (670). The topmost portlet from this list, i.e., the portlet which optimally obeys the portlet binding policy, is selected (680). Processing continues with the portlet container preparing the portlet context and invoking the portlet according to prior art techniques (690).

Figure 5:
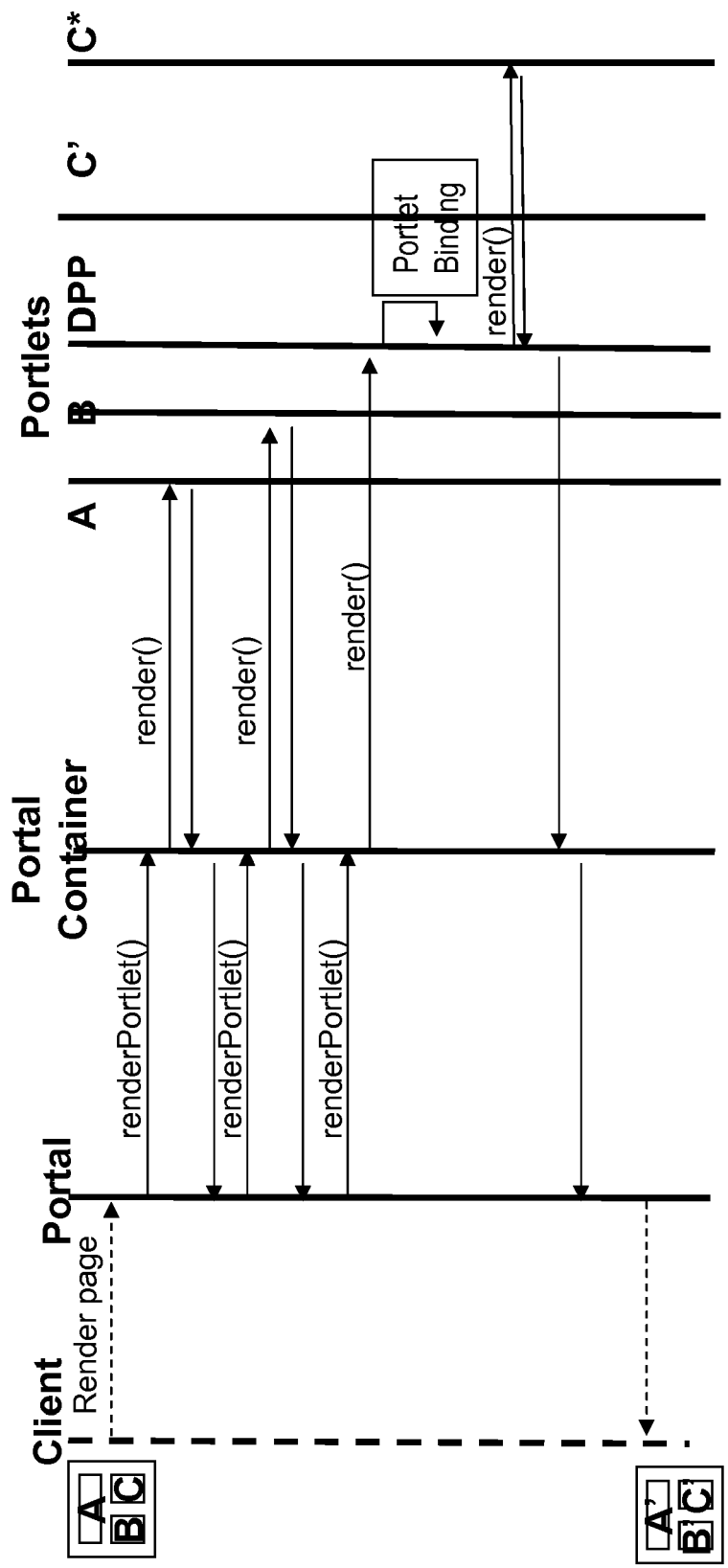

FIG. 5 illustrates an alternative embodiment, where the dynamic portlet binding (DPB) is not performed by the portlet container, but is performed instead by a special portlet, a Dynamic Proxy Portlet (DPP). In this way, the portlet container does not need to be changed. Instead, the administrator deploys the DPP, which contains the DPB functionality. Here the portlet container acts according to the prior art by accepting the request from aggregation, determining the portlet identifier, preparing the portlet context, and invoking the portlet.

In FIG. 5, for example, portlets A and B are prior art portlets. In this example, the administrator is assumed to have replaced portlet C by a Dynamic Proxy Portlet DPP. When the portlet container invokes DPP, DPP will perform the DBP procedure, thus realizing the control flow according to FIG. 6. Here, there are two portlets C' and C* associated with the same portlet class as portlet C. Thus, DPP selects the portlet optimally according to the portlet binding policy from these two portlets, e.g., C*.

The invention can take the form of an entirely hardware embodiment, an entirely software embodiment, or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. A method for binding a portlet into a web portal infrastructure comprising at least a portal and a plurality of portlets, comprising:
   a) storing a portlet profile data structure, wherein the portlet profile data structure is associated with a portlet and is deployed at a portal server, and wherein the portlet profile data structure declares a portlet class and at least one portlet quality of service characteristic;
   b) storing a portlet binding policy data structure, which is associated with the portlet class and is deployed at a portal server, wherein the portlet binding policy data structure contains a set of predicates specifying the at least one portlet quality of service characteristic;
   c) processing of an incoming request for a portlet, comprising:
      determining the portlet class of the requested portlet;
      selecting all stored portlet profile data structures for the portlet class of the requested portlet; and
      selecting the portlet binding policy data structure associated with the requested portlet;
   d) performing a cross-checking of the set of predicates of the selected binding policy data structure against the portlet quality of service characteristics of the selected portlet profile data structures, wherein the cross-checking seeks optimal adherence to the selected binding policy data structure;
   e) selecting an optimal portlet out of the selected portlets in response to the cross-checking; and
   f) invoking the optimal portlet for rendering in response to the incoming request.

2. The method according to claim 1, wherein the set of predicates specifies an acceptable range for the at least one portlet quality of service characteristic.

3. The method according to claim 2, wherein a portlet container of the web portal infrastructure comprises logic for implementing c) through f).

4. The method according to claim 2, wherein a dynamic proxy portlet of the web portal infrastructure comprises logic for implementing c) through f).

5. The method according to claim 2, wherein the portlet quality of service characteristics of the portlet profile data structure reflects at least one of:
   a runtime behavior of a portlet; and
   a distinction of the portlet content;
   wherein the selection comprises rules defining a relation to or a preference of the portlet characteristics.

6. A portal server within a web portal infrastructure comprising at least one portal and a plurality of portlets, comprising:
   at least one computer hardware device configured to receive and process a request incoming from a client requesting a portlet, including:
   a system for storing a portlet profile data structure, wherein the portlet profile data structure is associated with a portlet and is deployed at a portal server, and wherein the portlet profile data structure declares a portlet class and at least one portlet quality of service characteristic;
   a system for storing a portlet binding policy data structure, which is associated with the portlet class and is deployed at a portal server, wherein the portlet binding policy data structure contains a set of predicates specifying the at least one portlet quality of service characteristic;
   a system for processing of an incoming request for a portlet, comprising:
      determining the portlet class of the requested portlet;
      selecting all stored portlet profile data structures associated with the requested portlet; and
      selecting the portlet binding policy data structure associated with the requested portlet;
   a system for performing a cross-checking of the set of predicates of the selected binding policy data structure against the portlet quality of service characteristics of the selected portlet profile data structures, wherein the cross-checking seeks optimal adherence to the selected binding policy data structure;
   a system for selecting an optimal portlet out of the selected portlets in response to the cross-checking; and
   a system for invoking the optimal portlet for rendering in response to the incoming request.

7. The portal server according to claim 6, wherein the set of predicates specifies an acceptable range for the at least one portlet quality of service characteristic.

8. The portal server according to claim 7, wherein the system for processing of an incoming request for a portlet, the system for performing a cross-checking of the set of predicates of the selected binding policy data structure against the portlet quality of service characteristics of the selected portlet profile data structures, the system for selecting an optimal portlet out of the selected portlets in response to the cross-checking, and the system for invoking the optimal portlet for rendering in response to the incoming request are implemented by a portlet container of the web portal infrastructure.

9. The portal server according to claim 7, wherein the system for processing of an incoming request for a portlet, the system for performing a cross-checking of the set of predicates of the selected binding policy data structure against the portlet quality of service characteristics of the selected portlet profile data structures, the system for selecting an optimal portlet out of the selected portlets in response to the cross-checking, and the system for invoking the optimal portlet for rendering in response to the incoming request are implemented by a dynamic proxy portlet of the web portal infrastructure.

10. The portal server according to claim 7, wherein the portlet characteristics of the portlet profile data structure reflects at least one of:
- a runtime behavior of a portlet; and
- a distinction of the portlet content; wherein the selection comprises rules defining
- a relation to or a preference of the portlet characteristics.

11. A program product stored on a computer readable storage medium, which when executed, binds a portlet into a web portal infrastructure comprising at least a portal and a plurality of portlets, the computer readable storage medium comprising program code for:
- storing a portlet profile data structure, wherein the portlet profile data structure is associated with a portlet and is deployed at a portal server, and wherein the portlet profile data structure declares a portlet class and at least one portlet quality of service characteristic;
- storing a portlet binding policy data structure, which is associated with the portlet class and is deployed at a portal server, wherein the portlet binding policy data structure contains a set of predicates specifying the at least one portlet quality of service characteristic;
- processing of an incoming request for a portlet, comprising:
  - determining the portlet class of the requested portlet;
  - selecting all stored portlet profile data structures for the portlet class of the requested portlet; and
  - selecting the portlet binding policy data structure associated with the requested portlet;
- performing a cross-checking of the set of predicates of the selected binding policy data structure against the portlet quality of service characteristics of the selected portlet profile data structures, wherein the cross-checking seeks optimal adherence to the selected binding policy data structure;
- selecting an optimal portlet out of the selected portlets in response to the cross-checking; and
- invoking the optimal portlet for rendering in response to the incoming request.

12. The program product according to claim 11, wherein the set of predicates specifies an acceptable range for the at least one portlet quality of service characteristic.

* * * * *